(12) United States Patent  
Hsu (10) Patent No.: US 11,789,211 B2  
(45) Date of Patent: Oct. 17, 2023

(54) OPTICAL FIBER CONNECTOR

(71) Applicant: Gloriole Electroptic Technology Corp., Kaohsiung (TW)

(72) Inventor: Hsien-Hsin Hsu, Kaohsiung (TW)

(73) Assignee: GLORIOLE ELECTROPTIC TECHNOLOGY CORP., Kaohsiung (TW)

( * ) Notice: Subject to any disclaimer, the term of this patent is extended or adjusted under 35 U.S.C. 154(b) by 66 days.

(21) Appl. No.: 17/565,798

(22) Filed: Dec. 30, 2021

(65) Prior Publication Data

US 2022/0236493 A1    Jul. 28, 2022

(30) Foreign Application Priority Data

Jan. 22, 2021   (TW) ................................. 110200829

(51) Int. Cl.
  *G02B 6/38*    (2006.01)
  *G02B 6/40*    (2006.01)
(52) U.S. Cl.
  CPC ......... *G02B 6/3831* (2013.01); *G02B 6/3898* (2013.01); *G02B 6/406* (2013.01)

(58) Field of Classification Search
  CPC ...... G02B 6/38; G02B 6/3831; G02B 6/3898; G02B 6/406
  See application file for complete search history.

(56) References Cited

U.S. PATENT DOCUMENTS

2021/0302666 A1*  9/2021  Gandla ................ G02B 6/3893

* cited by examiner

*Primary Examiner* — Tina M Wong  
(74) *Attorney, Agent, or Firm* — Muncy, Geissler, Olds & Lowe, P.C.

(57) ABSTRACT

An optical fiber connector includes an outer housing, a rear member sleeved on a rear end of the outer housing, a polarity key, and a release pull lever. The polarity key includes a body part extending from the rear member and located on one side of the outer housing, a latching part formed with a cutout and having a first sloping surface, and a locking protrusion extending from the latching part. The release pull lever is disposed on the outer housing and has a driving portion protruding into the cutout and being in sliding contact with the first sloping surface, such that rearward movement of the release pull lever drives the locking protrusion to move close to the outer housing.

6 Claims, 9 Drawing Sheets

OPTICAL FIBER CONNECTOR

CROSS-REFERENCE TO RELATED APPLICATIONS

This application claims priority of Taiwanese Patent Application No. 110200829, filed on Jan. 22, 2021.

FIELD

The disclosure relates to a connector, more particularly to an optical fiber connector with a changeable polarity.

BACKGROUND

Figure 1:
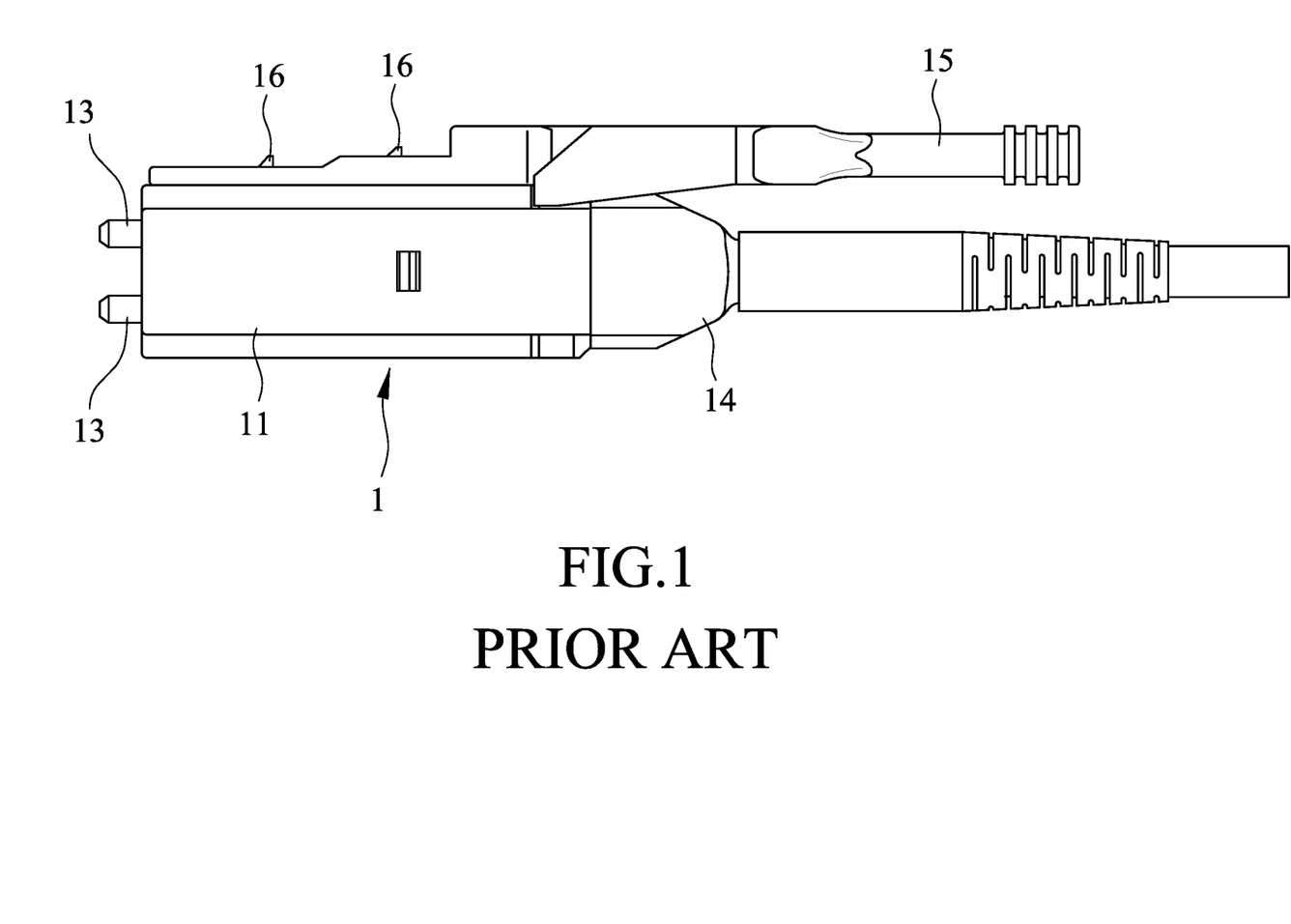
FIG. 1 is a side view of a conventional optical fiber connector.
Figure 2:
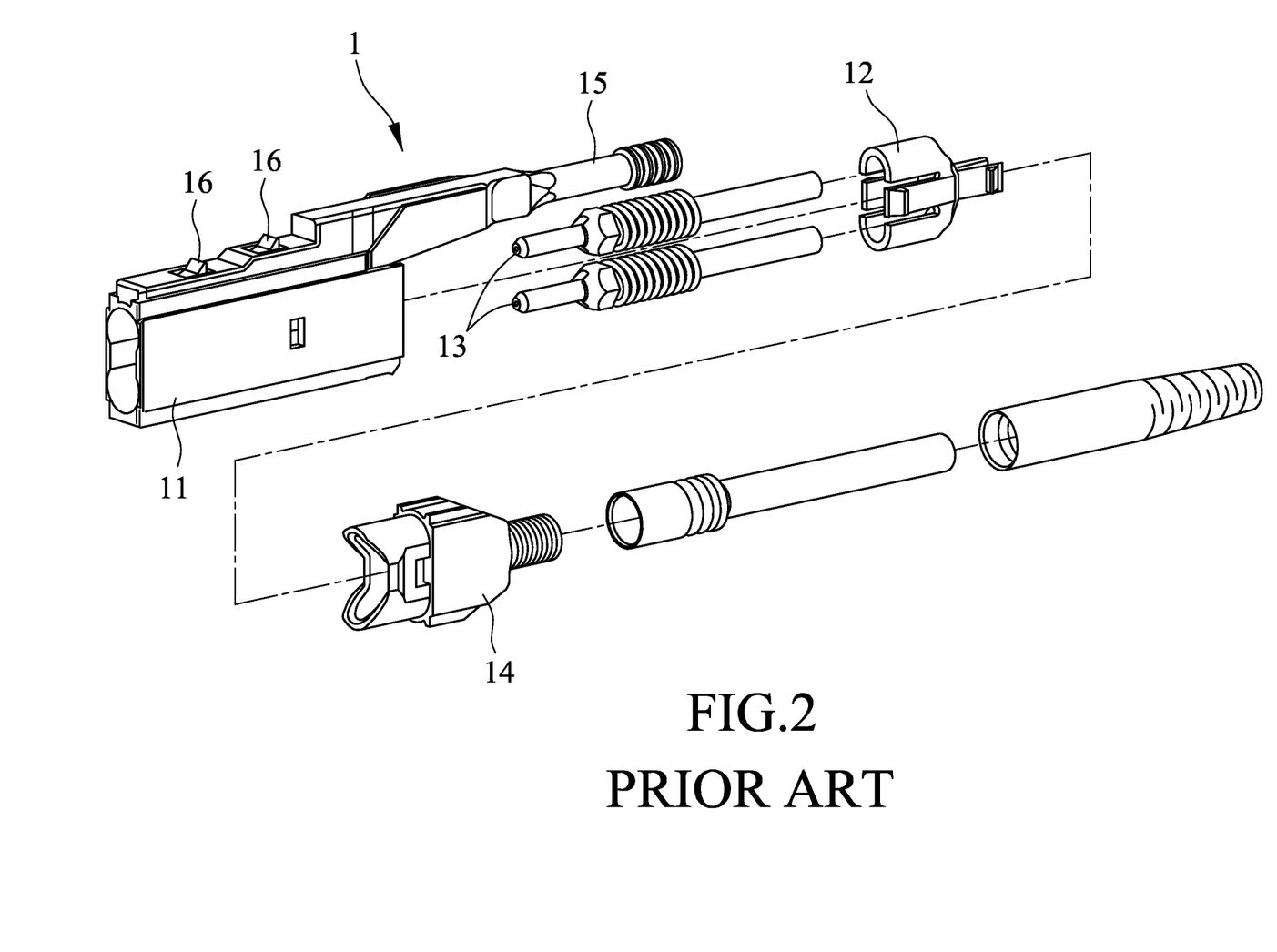
FIG. 2 is an exploded perspective view of the conventional optical fiber connector.

With the development of data transmission technology, optical fiber connectors with new specifications, such as QSFP (Quad Small Form-factor Pluggable) interface, have been introduced to cope with high-speed optical fibers. As shown in FIGS. 1 and 2, a conventional optical fiber connector 1 includes a connector housing 11, a limiting member 12 fastened in the connector housing 11, two ferrules 13 spaced apart from each other and held between the limit member 12 and the connector housing 11, a boot 14 removably assembled to the rear of the connector housing 11, a pull lever 15 provided on the connector housing 11 and extending backward, and two fastening protrusions 16 protruding from the connector housing 11. When the conventional optical fiber connector 1 is plugged into an adapter or a receptacle (not shown), the connector housing 11 is inserted in the adapter or receptacle, and at least one of the two fastening protrusions 16 is engaged with a corresponding slot in the adapter or receptacle, such that the two ferrules 13 can be connected respectively with two corresponding ferrules (not shown) in the adapter or receptacle. Different connection modes can be obtained by varying the connection alignment of the ferrules 13 and the corresponding ferrules in the adapter or receptacle.

However, when the conventional optical fiber connector 1 is to be unplugged, the connector housing 11 can only be pulled apart forcefully to detach the fastening protrusions 16 from the corresponding slots of the adapter or receptacle. This operation is likely to cause the fastening protrusions 16 or slots to be worn out over time due to the forceful pulling, and even result in breakage of the fastening protrusions. Although some users will try to pull the pull lever 15 upward to cause a displacement of the housing 11 relative to the mated adapter or receptacle to thereby detach the fastening protrusions 16 from the slot on the mated adapter or receptacle, this practice is not in line with the original design intention. Therefore, problems may occur such as insufficient displacement of the fastening protrusions 16 or an excessive pulling force from the user breaking the pull lever 15. More importantly, the conventional optical fiber connector 1 is often connected in an array of optical fiber connectors in a narrow space; therefore, the dense neighboring optical fiber connectors or receptacles will obstruct the upward movement of the pull lever 15.

SUMMARY

Therefore, the object of the disclosure is to provide an optical fiber connector that is easy to operate without causing damage to the parts during removal from an adapter or a receptacle.

According to the disclosure, an optical fiber connector includes an outer housing, a rear member, a polarity key, and a release pull lever. The outer housing extends in a front-and-rear direction. The rear member is removably sleeved on a rear end of the outer housing. The polarity key includes a body part, a latching part, and a locking protrusion. The body part extends forward from the rear member and is located on one side of the outer housing in a first direction perpendicular to the front-and-rear direction. The latching part extends forward from the body part, is formed with a cutout, and has a first sloping surface facing the cutout. The locking protrusion is located on a front end of the latching part and extends in the first direction away from the outer housing. The release pull lever is removably disposed on the outer housing, and is rearward slidable. The release pull lever has a manipulating protrusion and a driving portion that protrudes from the manipulating portion into the cutout. The driving portion is in sliding contact with the first sloping surface of the latching part of the polarity key, such that rearward movement of the release pull lever drives the latching part and the locking protrusion to move close to the outer housing via the sliding contact between the first sloping surface of the latching part and the driving portion of the release pull lever.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
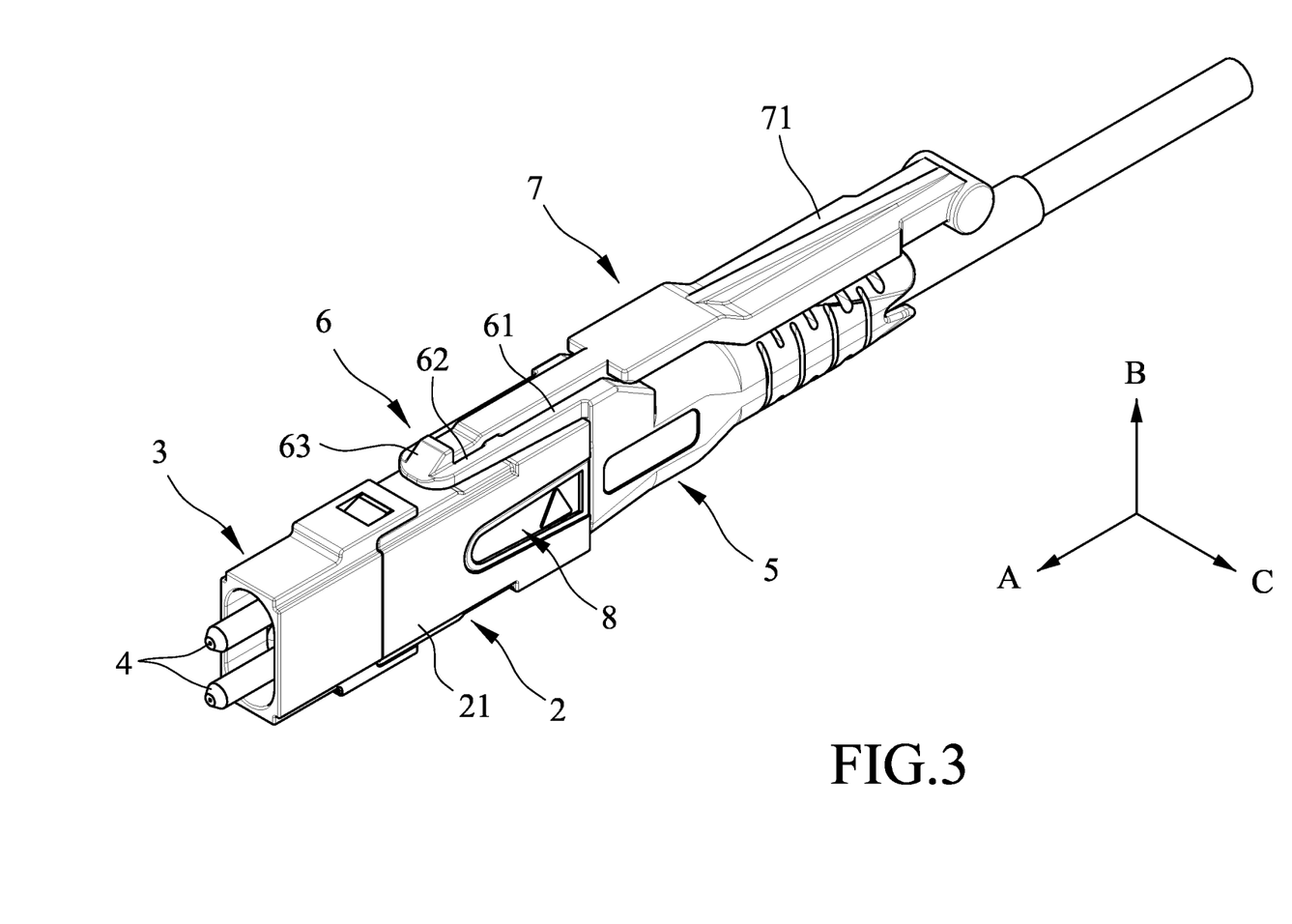
FIG. 3 is an assembled perspective view of an embodiment of the optical fiber connector according to the disclosure.
Figure 4:
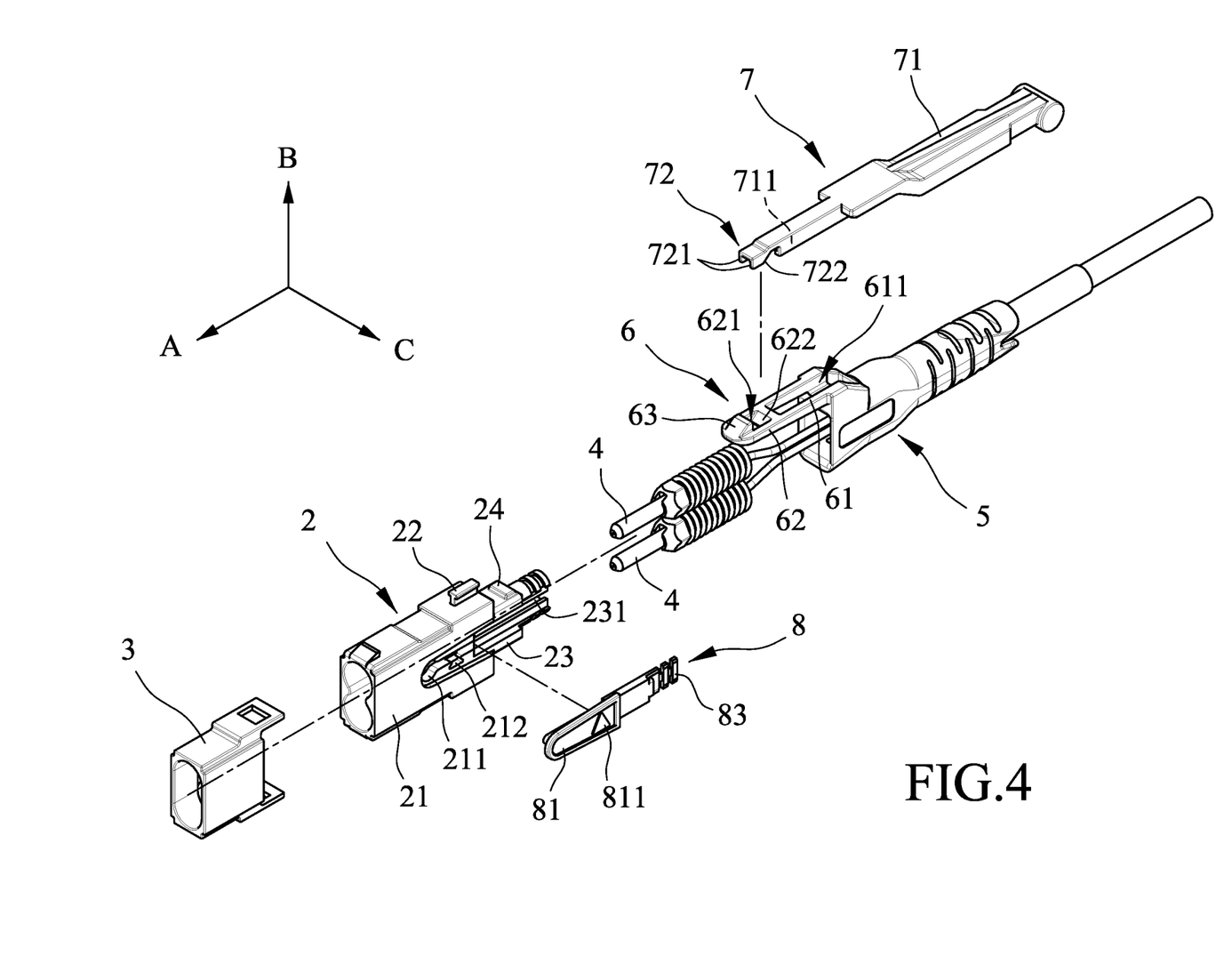
FIG. 4 is an exploded perspective view of the embodiment.
Figure 5:
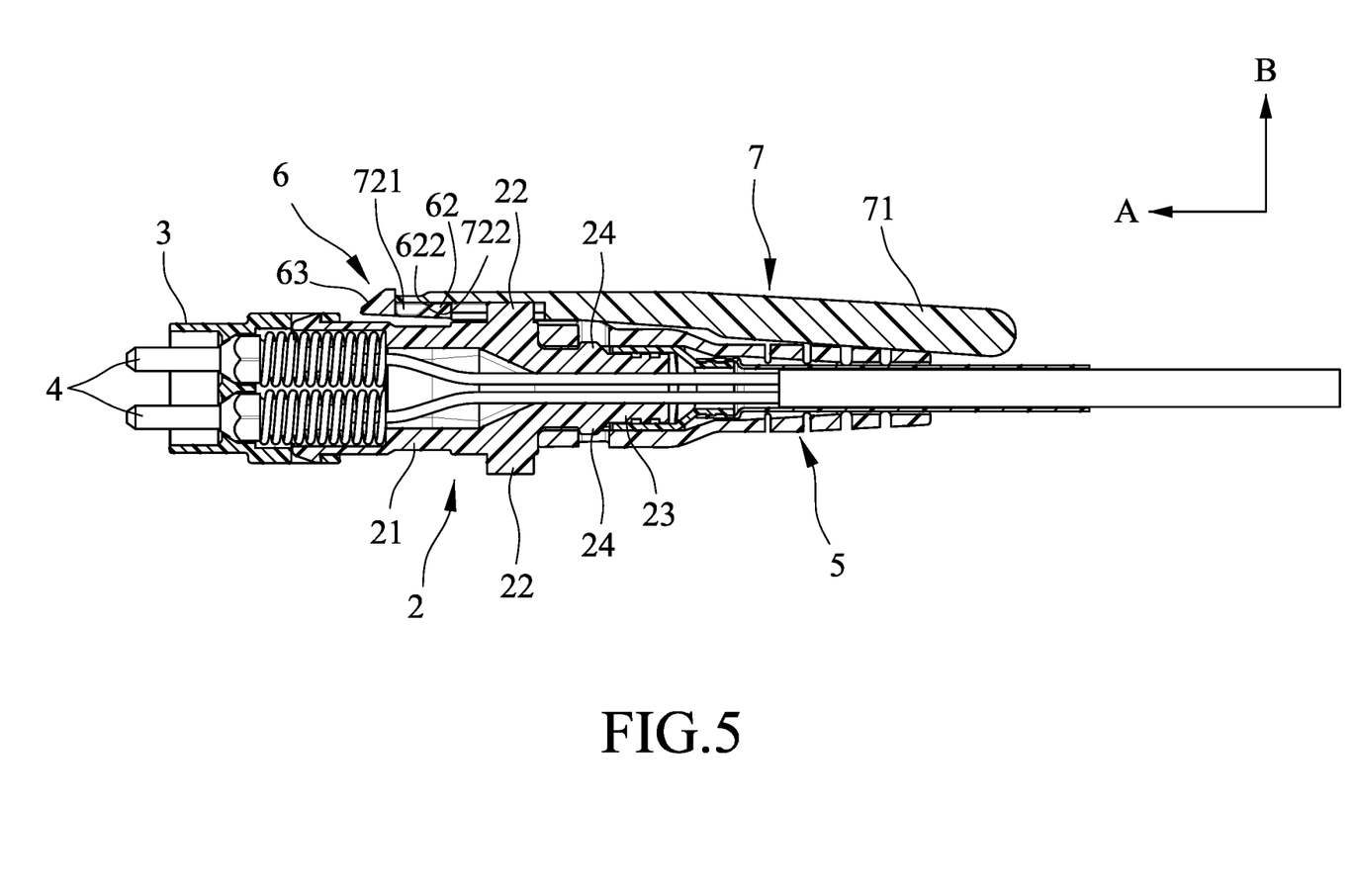
FIG. 5 is a longitudinal sectional view of the embodiment.

As shown in FIGS. 3, 4, and 5, the embodiment of an optical fiber connector according to the present disclosure is described with reference to three directions, including a front-and-rear direction (A), a first direction (B) perpendicular to the front-and-rear direction (A), and a second direction (C) perpendicular to both the front-and-rear direction (A) and the first direction (B). In this embodiment, the front-and-rear direction (A) denotes the direction of plugging in the optical fiber connector, the first direction (B) is the top-and-bottom direction, and the second direction (C) is the left-and-right direction. It should be noted that the aforementioned definitions of the directions are for convenience of explanation and should not impose any restrictions on the use and structure of the disclosure. The optical fiber connector is adapted to be plugged into an adapter or a receptacle (not shown), and includes an outer housing 2 extending in the front-and-rear direction (A), a limit member 3 removably coupled to a front end of the outer housing 2, two ferrules 4 spaced apart from each other in the first direction (B) and positioned in the outer housing 2 and the limit member 3, a rear member 5 removably sleeved on a rear end of the outer housing 2, a polarity key 6 connected to the rear member 5, a release pull lever 7 removably disposed on the outer housing 2 and rearward slidable, and an indicating component 8 connected to one side of the outer housing 2 and is removable from the outer housing 2 in the second direction (C).

The outer housing 2 includes a main body 21 that extends in the front-and-rear direction (A), and two guide bars 22 that are elongated in the front-and-rear direction (A), that are disposed opposite to each other in the first direction (B), and that protrude outwardly from the main body 21 and respectively in opposite directions. In this embodiment, the guide bars 22 protrudes upwardly and downwardly from the main body 21, respectively. The housing further includes a tail part 23 connected to a rear end of the main body 21, and two projections 24 disposed opposite to each other in the first direction (B) and protruding outwardly from the tail part 23 and respectively in opposite directions. In this embodiment, the projections 24 protrudes upwardly and downwardly from the tail part 23, respectively. In this embodiment, the main body 21 is formed with a first fitting slot 211 recessed from a lateral side thereof, and an engaging groove 212 spatially connected with the first fitting slot 211. The tail part 23 is formed with a second fitting slot 231 extending in the front-and-rear direction (A), spatially connected with the engaging groove 212, and having a rear end that is located in the rear member 5. The rear member 5 is removably engaged with the projections 24.

Figure 6:
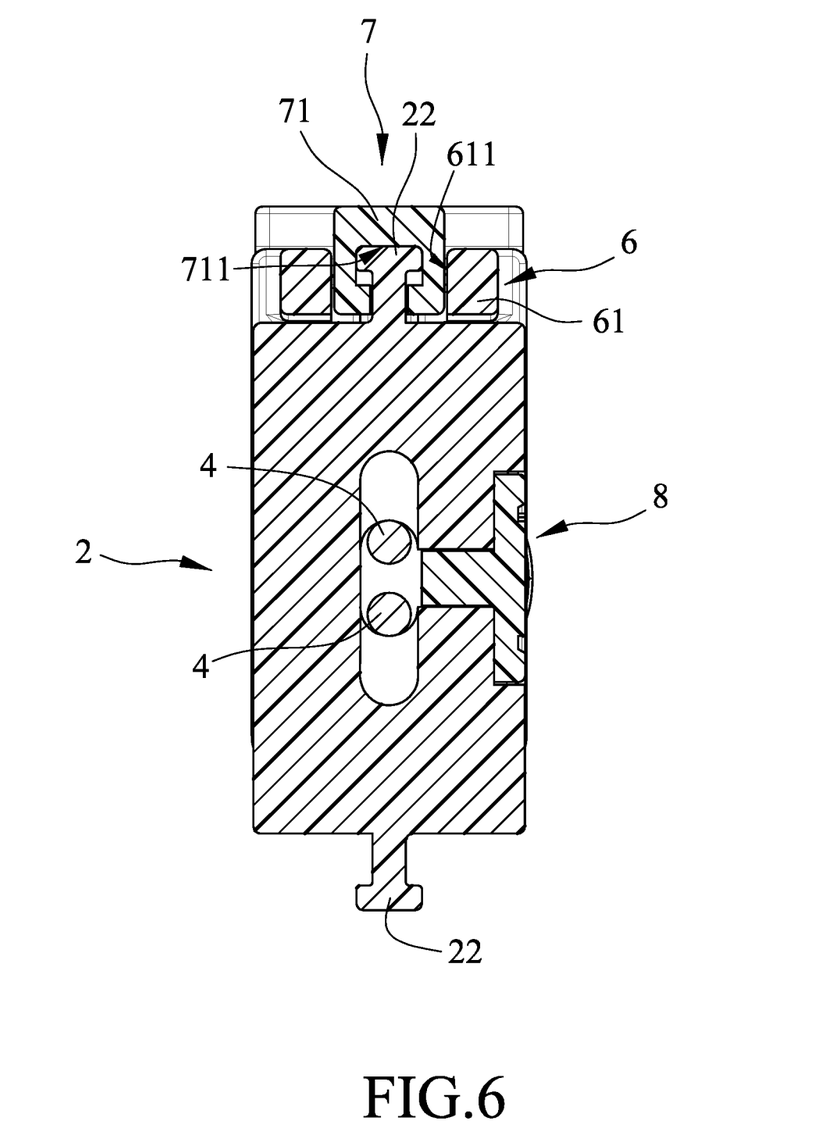
FIG. 6 is a cross-sectional view, illustrating the coupling between a release pull lever and an outer housing of the embodiment.
Figure 7:
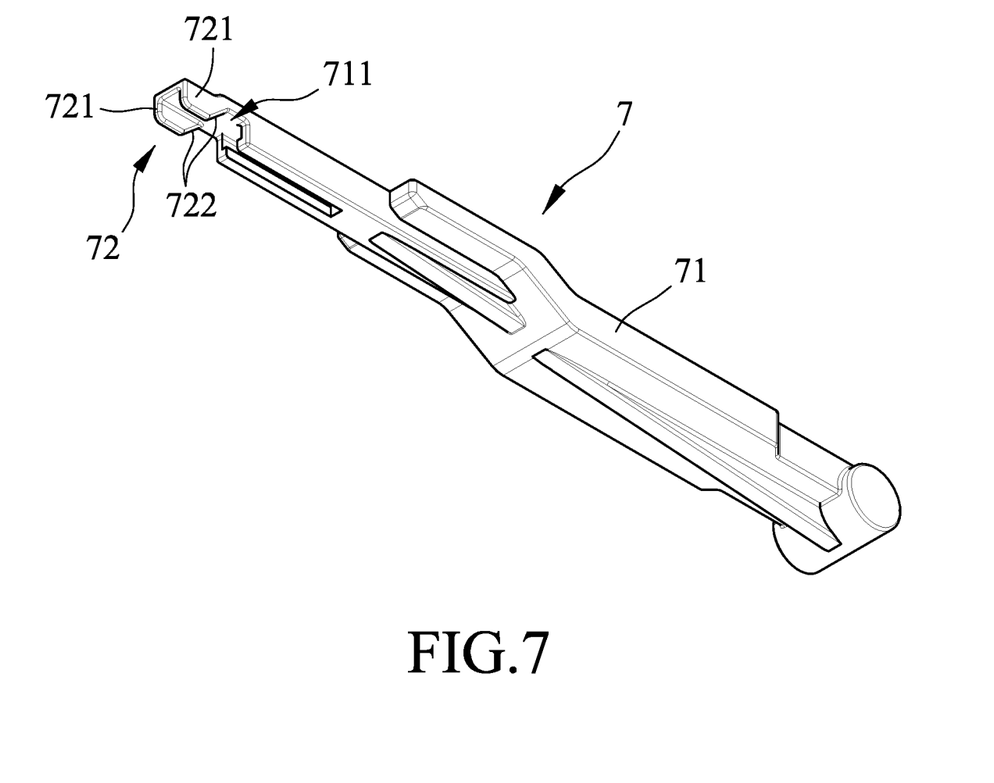
FIG. 7 is a perspective view of the release pull lever of the embodiment.

Referring to FIGS. 4, 6, and 7, the polarity key 6 and the rear member 5 are integrally formed as one piece, and the polarity key 6 is disposed between the release pull lever 7 and the outer housing 2. The polarity key 6 includes a body part 61 that extends forward from the rear member 5 and that is located on one side of the outer housing 2 in the first direction B, a latching part 62 that extends forward from the body part 61 and that has a cutout 621, and a locking protrusion 63 that is located on a front end of the latching part 62 and that extends in the first direction (B) away from the outer housing 2. The body part 61 has a first guide recess 611 that extends in the front-and-rear direction (A) and that has a rear open end. The latching part 62 has a first sloping surface 622 facing the cutout 621. The locking protrusion 63 is adapted to be engaged with a corresponding slot in the adapter or receptacle when the optical fiber connector is in use and inserted into the adapter or receptacle. The release pull lever 7 extends in the front-and-rear direction (A), and has a manipulating portion 71 and a driving portion 72 that protrudes from a front end of the manipulating portion 71 into the cutout 621. A portion of the manipulating portion 71 extends into the first guide recess 611. The portion of the manipulating portion 71 has a second guide recess 711 that extends in the front-and-rear direction (A) and that has a front open end. One of the guide bars 22 slidably engages the second guide recess 711. The driving portion 72 includes two tabs 721 engaging the cutout 621 of the polarity key 6 and spaced apart in the second direction (C). Each tab 721 has a second sloping surface 722 which is in sliding contact with the first sloping portion 622 of the latching part 62 of the polarity key 6.

Figure 8:
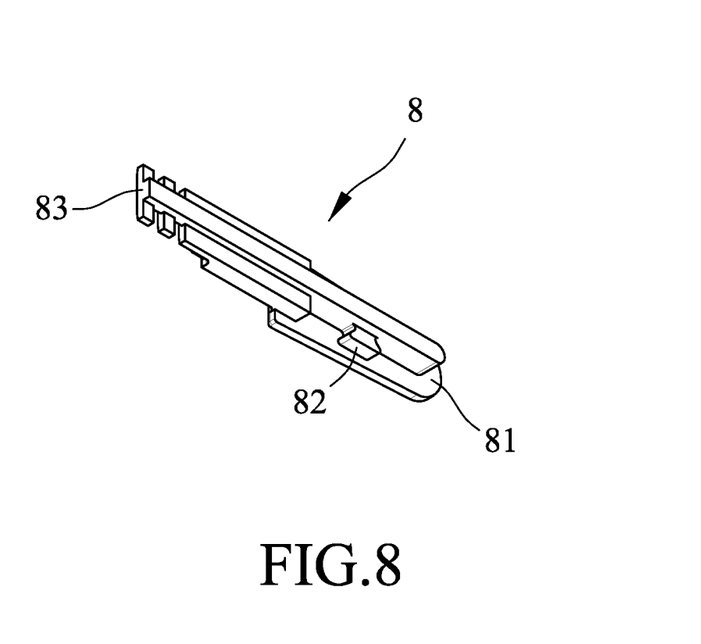
FIG. 8 is a perspective view of an indicating component of the embodiment.

Referring to FIGS. 3, 4, and 8, the indicating component 8 includes a plate body 81 extending in the front-and-rear direction (A), having an exposed indicating symbol 811, and engaged with the first fitting slot 211. In this embodiment, the indicating component 8 further includes an engaging portion 82 protruding from the plate body 81 and engaged with the engaging groove 212, and a tail extension 83 extending rearward from the plate body 81, engaged with the second fitting slot 231, and partially accommodated in the rear member 5.

Figure 9:
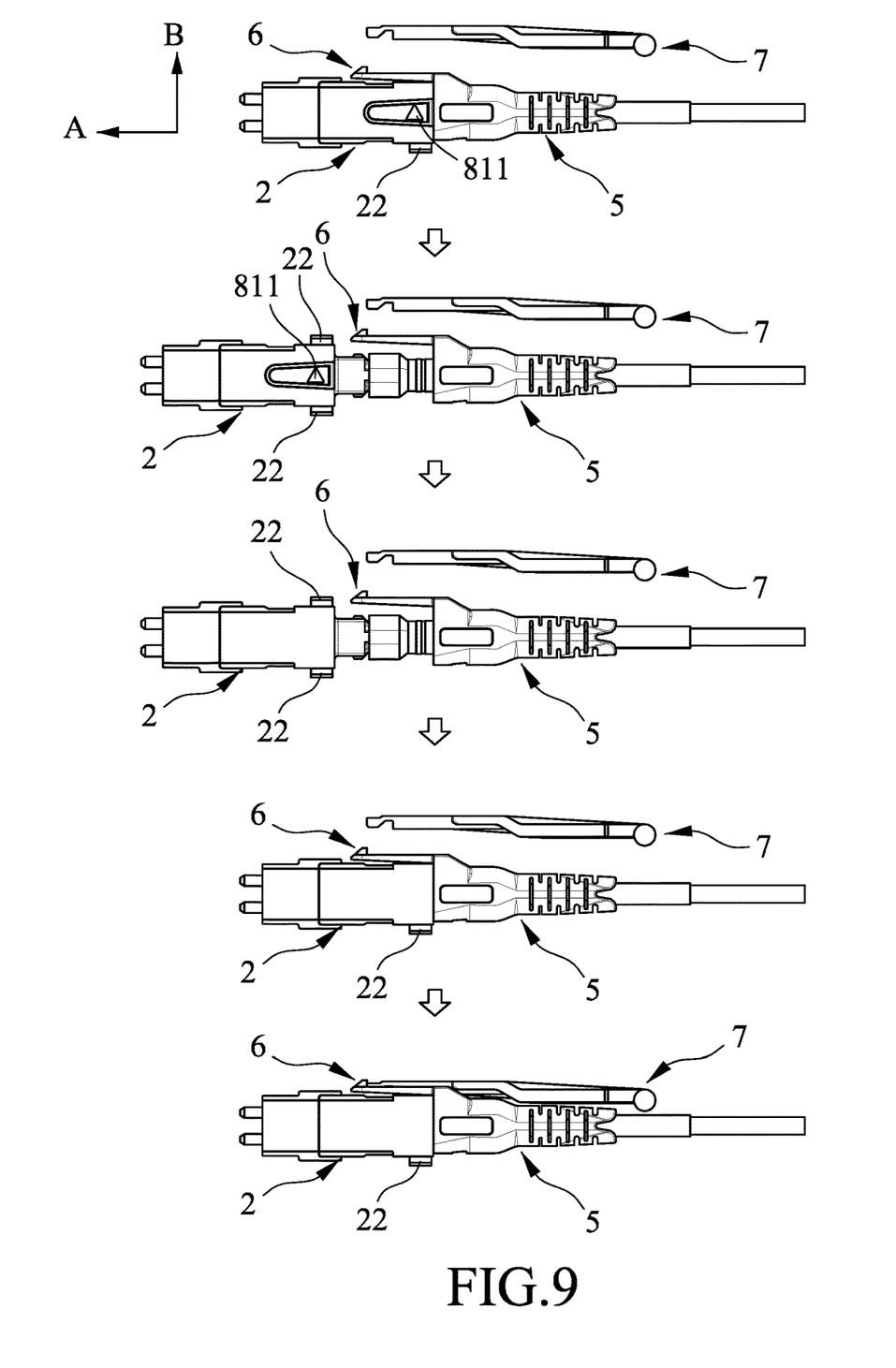
FIG. 9 depicts a procedure for changing the polarity of the embodiment.

Referring to FIGS. 3, 4, and 9, the procedure for changing the polarity of this embodiment is illustrated in FIG. 9, with the release pull lever 7 shown in a separated position in the top four steps. In the first step, the release pull lever 7 is pulled backward so that the driving portion 72 thereof slides out of the cutout 621. In the second step, the release pull lever 7 is further pulled backward until the guide bar 22 that is located in the second guide recess 711 moves out of the second guide recess 711. Then, in the third step, the rear member 5 and the polarity key 6 are pulled backward and removed from the outer housing 2, and the outer housing 2 is rotated about its axis by 180 degrees. In the fourth and fifth steps, the outer housing 2 is reassembled with the rear member 5 and the release pull lever 7, such that the other guide bar 22 is engaged in the second guide recess 711 (i.e., the polarity key 6 is now located on the opposite side of the outer housing 2), thus the polarity change procedure is completed. The indicating symbol 811 of the indicating component 8 may be an arrow sign, so that a user can distinguish the polarity of the optical fiber connector easily by checking whether the arrow sign of the indicating symbol 811 points to the polarity key 6 or not.

Figure 10:
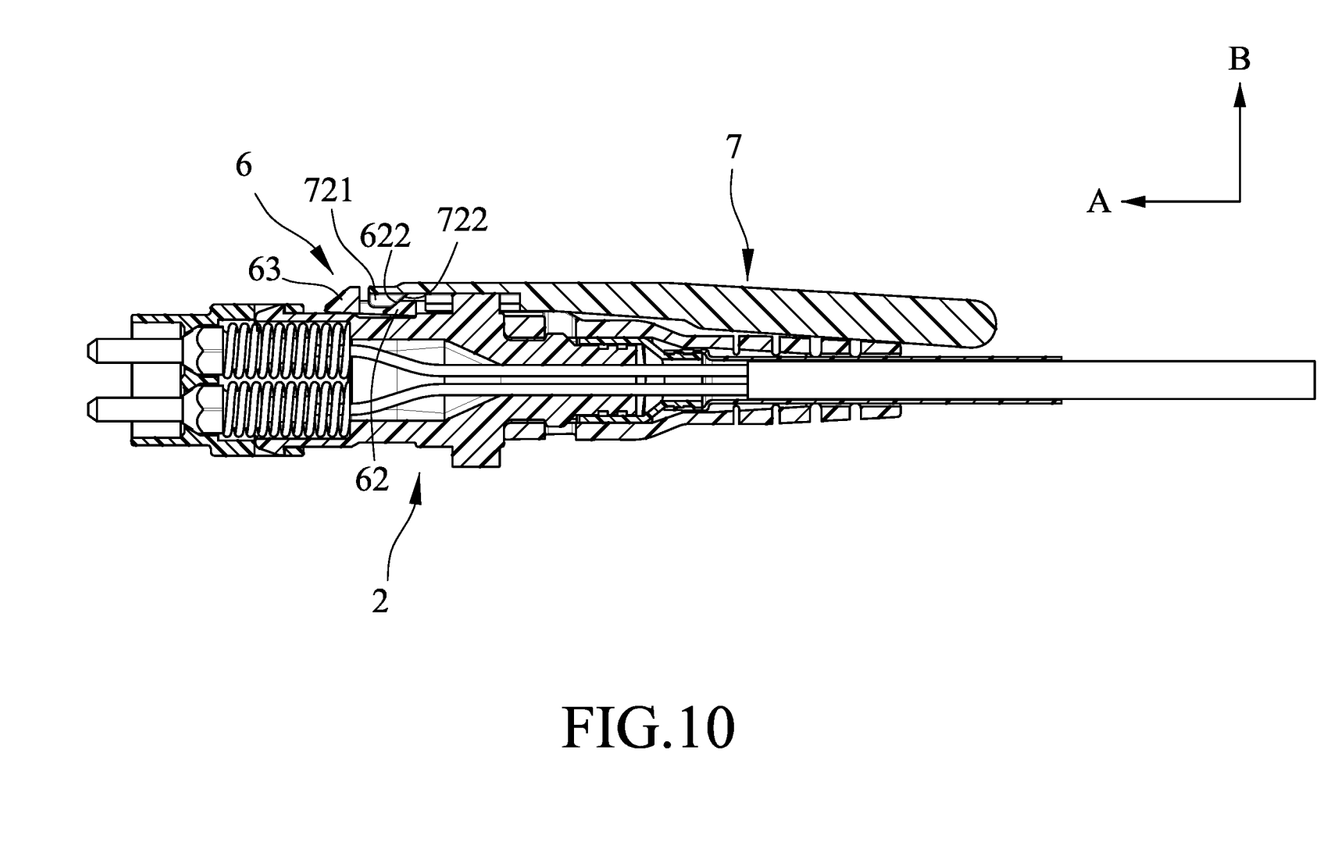
FIG. 10 is a longitudinal sectional view illustrating a locking protrusion of a polarity key of the embodiment in an unfastened state.

Referring to FIGS. 4, 5, and 10, when the optical fiber connector of the disclosure is to be removed from the adapter or receptacle, the user only needs to pull the release pull lever 7 backward, the latching part 62 and the locking protrusion 63 of the polarity key 6 will be driven to move close to the outer housing 2 via the sliding contact between the first sloping surface 622 of the latching part 62 and the second sloping surface 722 of the driving portion 72 of the release pull lever 7, thereby converting the locking protrusion 63 to an unfastened state to be disengaged from the corresponding slot in the adapter or receptacle. Thus, the user can unplug the optical fiber connector without obstruction and prevent the locking protrusion 63 from being worn. Accordingly, this disclosure not only reduces the difficulty of operation but also improves product life.

In summary, the disclosure enables quick polarity change by separating the rear member 5 from the outer housing 2 and rotating the outer housing 2 about its axis 180 degrees. The polarity key 6 can be driven to be unfastened from the mated adapter or receptacle by pulling the release pull lever 7 backward. Therefore, the optical fiber connector according to this disclosure is designed to be pulled by a user, and can be operated by the user without the application of excessive force. The product life of the optical fiber connector can therefore be extended. Moreover, such operation of the release pull lever 7 makes the optical fiber connector suitable for use in a dense optical fiber connectors array with a small space, so it can indeed achieve the purpose of the disclosure.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connector comprising:
    an outer housing extending in a front-and-rear direction;
    a rear member removably sleeved on a rear end of said outer housing;
    a polarity key including
        a body part that extends forward from said rear member and that is located on one side of said outer housing in a first direction perpendicular to the front-and-rear direction,
        a latching part that extends forward from said body part, that is formed with a cutout, and that has a first sloping surface facing said cutout, and
        a locking protrusion that is located on a front end of said latching part and that extends in the first direction away from said outer housing; and
    a release pull lever removably disposed on said outer housing and rearward slidable, said release pull lever having a manipulating portion and a driving portion that protrudes from said manipulating portion into said cutout, said driving portion being in sliding contact with said first sloping surface of said latching part of said polarity key, such that rearward movement of said release pull lever drives said latching part and said locking protrusion to move close to said outer housing via the sliding contact between said first sloping surface of said latching part and said driving portion of said release pull lever,
    wherein said outer housing includes a main body that extend in the front-and-rear direction, and two guide bars that are elongated in the front-and-rear direction, that are disposed opposite to each other in the first direction, and that protrude outwardly from said main body and respectively in opposite directions;
    wherein said body part of said polarity key has a first guide recess that extends in the front-and-rear direction and that has a rear open end, a portion of said manipulating portion of said release pull lever extending into said first guide recess; and
    wherein said portion of said manipulating portion of said release pull lever has a second guide recess that extends in the front-and-rear direction and that has a front open end, one of said guide bars slidably engaging said second guide recess.

2. The optical fiber connector as claimed in claim 1, wherein said driving portion of said release pull lever includes two tabs engaging said cutout of said polarity key and spaced apart from each other in a second direction that is perpendicular to the front-and-rear direction and the first direction, each tab having a second sloping surface that is in sliding contact with said first sloping surface of said latching part of said polarity key.

3. The optical fiber connector as claimed in claim 1, wherein:
    said outer housing further includes a tail part connected to a rear end of said main body, and two projections disposed opposite to each other in the first direction, and protruding outwardly from said tail part and respectively in opposite directions; and
    said rear member is sleeved on said tail part and engage said projections.

4. The optical fiber connector as claimed in claim 1, further comprising a limit member removably coupled to a front end of said outer housing, and two ferrules spaced apart from each other in the first direction and positioned in said limit member and said outer housing.

5. The optical fiber connector as claimed in claim 1, further comprising an indicating component connected to said outer housing, being removable from said outer housing in the second direction, and having an exposed indicating symbol.

6. The optical fiber connector as claimed in claim 5, wherein:
    said indicating component includes a plate body having said exposed indicating symbol, at least one engaging portion protruding from said plate body, and a tail extension extending rearward from said plate body and accommodated in said rear member;
    said main body of said outer housing is formed with a first fitting slot engaged with said plate body of said indicating component, and at least one engaging groove spatially connected with said first fitting slot and engaged with said at least one engaging portion of said indicating component; and
    said tail part of said outer housing is formed with a second fitting slot spatially connected with said at least one engaging groove, engaged with said tail extension of said indicating component, and having a rear end that is located in the rear member.

* * * * *